United States Patent
Lin

(10) Patent No.: US 10,849,202 B1
(45) Date of Patent: Nov. 24, 2020

(54) LIGHTING SYSTEM

(71) Applicant: Chicony Power Technology Co., Ltd., New Taipei (TW)

(72) Inventor: Chen-Chi Lin, New Taipei (TW)

(73) Assignee: CHICONY POWER TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 16/869,603

(22) Filed: May 8, 2020

(30) Foreign Application Priority Data

Feb. 15, 2020 (TW) .............................. 109104898 A

(51) Int. Cl.
| | | |
|---|---|---|
| *H05B 37/02* | (2006.01) | |
| *H05B 45/3725* | (2020.01) | |
| *H02M 3/156* | (2006.01) | |
| *H05B 45/10* | (2020.01) | |
| *H05B 47/10* | (2020.01) | |
| *H05B 45/30* | (2020.01) | |

(52) U.S. Cl.
CPC ........ *H05B 45/3725* (2020.01); *H02M 3/156* (2013.01); *H05B 45/10* (2020.01); *H05B 45/30* (2020.01); *H05B 47/10* (2020.01)

(58) Field of Classification Search
CPC ..... H05B 45/3725; H05B 45/30; H05B 47/10
See application file for complete search history.

(56) References Cited

U.S. PATENT DOCUMENTS

| | | | |
|---|---|---|---|
| 8,659,237 B2 | 2/2014 | Archenhold et al. | |
| 8,901,847 B2 * | 12/2014 | Suzuki | H05B 47/16 315/291 |
| 9,203,328 B2 * | 12/2015 | Freeman | H02M 1/36 |
| 9,763,289 B2 * | 9/2017 | Herfurth | H05B 45/00 |
| 10,166,912 B2 * | 1/2019 | Wonhong | B60Q 1/1423 |
| 10,510,297 B2 * | 12/2019 | Jiang | G09G 3/3258 |

(Continued)

FOREIGN PATENT DOCUMENTS

| | | |
|---|---|---|
| CN | 207705835 U | 8/2018 |
| CN | 108770126 A | 11/2018 |

(Continued)

OTHER PUBLICATIONS

"High-Power LED Driver with Integrated High-Side Led Current Sense and PWM Dimming MOSFET Driver", 2015 Maxim Integrated Products, Inc., p. 1-23, retrieved from https://datasheets.maximintegrated.com/en/ds/MAX16834.pdf.

*Primary Examiner* — Thuy Vinh Tran
(74) *Attorney, Agent, or Firm* — CKC & Partners Co., LLC

(57) ABSTRACT

A lighting system suitable for receiving two kinds of power signals includes a light emitting unit, a switch control circuit, first and second power adjustment circuits, and first and second switches. The switch control circuit is electrically connected to the light emitting unit, the first and second switches. When the light emitting unit and the switch control circuit receive a first power signal, the switch control circuit turns on the first switch and turns off the second switch, so that a first current drives the light emitting unit to emit. When the light emitting unit and the switch control circuit do not receive the first power signal and the second power adjustment circuit receives the second power signal, the switch control circuit turns off the first switch and turns on the second switch, so that a second current drives the light emitting unit to emit.

12 Claims, 3 Drawing Sheets

(56) References Cited

U.S. PATENT DOCUMENTS

2007/0273306 A1* 11/2007 Fujino .................... H05B 45/37
                                                                315/312
2015/0069908 A1*  3/2015 Fukui .................... H05B 45/48
                                                                 315/82

FOREIGN PATENT DOCUMENTS

| TW | I285571 B | 8/2007 |
| TW | I305974 B | 2/2009 |
| TW | I468069 B | 1/2015 |

* cited by examiner

LIGHTING SYSTEM

RELATED APPLICATIONS

The application claims priority to Taiwan Application Serial Number 109104898, filed Feb. 15, 2020, which is herein incorporated by reference.

BACKGROUND

Technical Field

The disclosure relates to a lighting system, particularly to a lighting system suitable for receiving two power signals.

Description of Related Art

In the regulations about vehicle lighting, lamps with different functions (for example: position lamps and daytime running lamps) must meet different lighting conditions (for example: brightness limit and light type) to achieve the purpose of traffic safety.

Generally speaking, a switching power supply is used when the wattage of lamps is large, and a linear power supply is used when the wattage of lamps is small, which can achieve different purposes of fixed brightness. To use the same set of light-emitting diode (LED) to produce a variety of brightness, the common practice is to use a switching power supply and general brightness adjustment method to achieve, such as pulse width modulation (PWM) dimming.

However, this method of brightness adjustment may result in excessive tolerances of the low-brightness output current of different lamps due to differences in parts when mass-producing products, resulting in failure to comply with the regulations for low-brightness lights.

Therefore, how to reduce the error of the output current of the lighting system at different brightness requirements is one of the important issues in the field.

SUMMARY

One aspect of the present disclosure is a lighting system. The lighting system is suitable for receiving a first power signal and a second power signal. The lighting system includes a light emitting unit, a first power adjustment circuit, a first switch, a second switch, a second power adjustment circuit and a switch control circuit. The first power adjustment circuit is electrically connected to the light emitting unit. The first switch is electrically connected to the first power adjustment circuit. The second switch is electrically connected to the light emitting unit. The second power adjustment circuit is electrically connected to the second switch. The switch control circuit is electrically connected to the light emitting unit, the first switch and the second switch. When the light emitting unit and the switch control circuit receive the first power signal, the switch control circuit turns on the first switch and turns off the second switch, so that a first current drives the light emitting unit to emit. When the light emitting unit and the switch control circuit do not receive the first power signal and the second power adjustment circuit receives the second power signal, the switch control circuit turns off the first switch and turns on the second switch, so that a second current drives the light emitting unit to emit.

In this way, the lighting system 100 selectively converts the electric energy into the current 11 or the current 12 by the corresponding one of the first power adjustment circuit 110 and the second power adjustment circuit 120 according to the power signal Vin1 and the power signal Vin2, so that the driving current received by the light emitting unit LED can be controlled within a smaller error, and so that the different brightness generated by the light emitting unit LED can meet the regulations.

DETAILED DESCRIPTION

The following embodiments are disclosed with accompanying diagrams for detailed description. For illustration clarity, many details of practice are explained in the following descriptions. However, it should be understood that these details of practice do not intend to limit the present disclosure. That is, these details of practice are not necessary in parts of embodiments of the present disclosure. Furthermore, for simplifying the diagrams, some of the conventional structures and elements are shown with schematic illustrations.

The terms used in this specification and claims, unless otherwise stated, generally have their ordinary meanings in the art, within the context of the disclosure, and in the specific context where each term is used. Certain terms that are used to describe the disclosure are discussed below, or elsewhere in the specification, to provide additional guidance to the practitioner skilled in the art regarding the description of the disclosure.

In the description herein and throughout the claims that follow, the terms "comprise" or "comprising," "include" or "including," "have" or "having," "contain" or "containing" and the like used herein are to be understood to be open-ended, i.e., to mean including but not limited to. In addition, in the description herein and throughout the claims that follow, the phrase "and/or" includes any and all combinations of one or more of the associated listed claims.

In this document, the term "coupled" may also be termed "electrically coupled," and the term "connected" may be termed "electrically connected." "Coupled" and "connected" may also be used to indicate that two or more elements cooperate or interact with each other.

It will be understood that, although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments.

Figure 1:
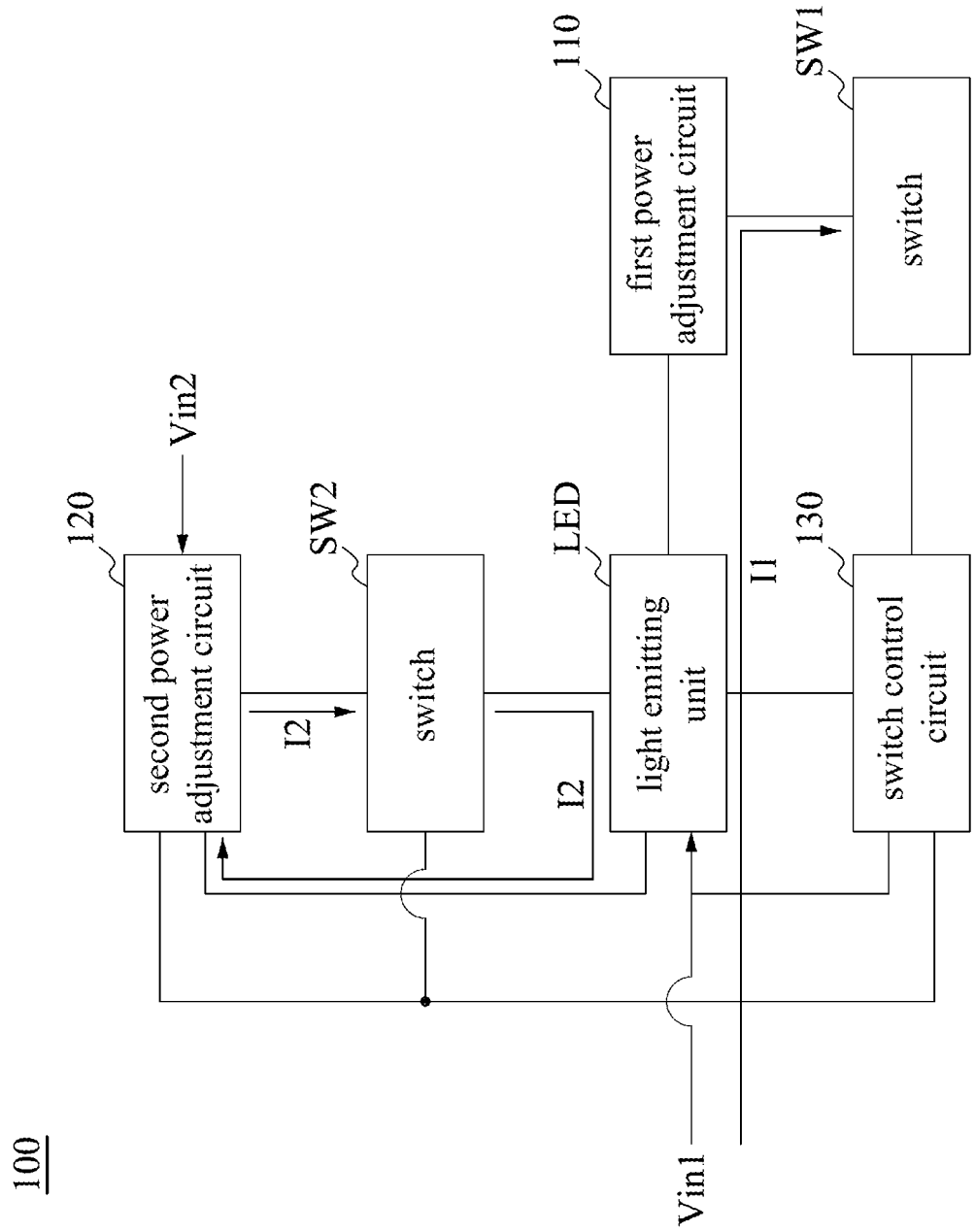
FIG. 1 is a schematic diagram illustrating a lighting system in accordance with some embodiments of the disclosure.

Please refer to FIG. 1. FIG. 1 is a schematic diagram illustrating a lighting system 100 in accordance with some embodiments of the disclosure. As shown in FIG. 1, the lighting system 100 includes a first power adjustment circuit 110, a second power adjustment circuit 120, a switch control circuit 130, a switch SW1, a switch SW2, and a light emitting unit LED. In some embodiments, the first power adjustment circuit 110 is a linear current source circuit. The second power adjustment circuit 120 is a switch power conversion circuit.

In structure, the second power adjustment circuit 120 is electrically connected to the switch SW2 and the light emitting unit LED. The switch SW2 is electrically connected to the light emitting unit LED. The first power adjustment circuit 110 is electrically connected to the switch SW1 and the light emitting unit LED. The switch control circuit 130 is electrically connected to the switch SW1, the switch SW2, the light emitting unit LED and the second power adjustment circuit 120.

Operationally, when the light emitting unit LED and the switch control circuit 130 receive a power signal Vin1, the switch control circuit 130 turns on the switch SW1 and turns off the switch SW2, so that a current I1 drives the light emitting unit LED to emit. Specifically, at this time, the current I1 flows through the light emitting unit LED, the first power adjustment circuit 110 and the switch SW1 in order.

On the other hand, when the light emitting unit LED and the switch control circuit 130 do not receive the power signal Vin1 and the second power adjustment circuit 120 receives a power signal Vin2, the switch control circuit 130 turns off the switch SW1 and turns on the switch SW2, so that a current I2 drives the light emitting unit LED to emit. Specifically, at this time, the current I2 is generated by the second power adjustment circuit 120 and flows through the switch SW2 and the light emitting unit LED in order.

The current I2 makes the light emitting unit LED consume more power than that of the current I1 makes the light emitting unit LED consume. In other words, the brightness of the light emitted by the light emitting unit LED driven by the first power adjustment circuit 110 with the current I1 is lower, and the brightness of the light emitted by the light emitting unit LED driven by the second power adjustment circuit 120 with the current I2 is higher. For example, the light emitting unit LED driven by the linear current source circuit with the current I1 is able to be a position lamp of a vehicle, and the light emitting unit LED driven by the switch power conversion circuit with the current I2 is able to be a daytime running lamp of the vehicle.

In addition, when the light emitting unit LED and the switch control circuit 130 do not receive the power signal Vin1 and the second power adjustment circuit 120 does not receive the power signal Vin2, both the switch SW1 and the switch SW2 do not turn on, so that the light emitting unit LED does not emit.

Since the driving current provided by the lighting system 100 to the light emitting unit LED is obtained by converting the electric energy by the linear current source circuit or the switch power conversion circuit, instead of using dimming, no matter the current for driving the light emitting unit LED is high current or low current, the current for driving the light emitting unit LED can be relatively fixed and less influenced by the components deviation generated during product production, so as to achieve the purpose of stabilizing the brightness of the light emitting unit LED.

That is, by the lighting system 100 selectively sending the current I1 or the current I2 to the light emitting unit LED through the corresponding first power adjustment circuit 110 or the second power adjustment circuit 120 according to the power signal Vin1 and the power signal Vin2, the current for driving the light emitting unit LED to emit can be controlled within a smaller error, so that the different brightness generated by the light emitting unit LED can meet the regulations.

Figure 2:
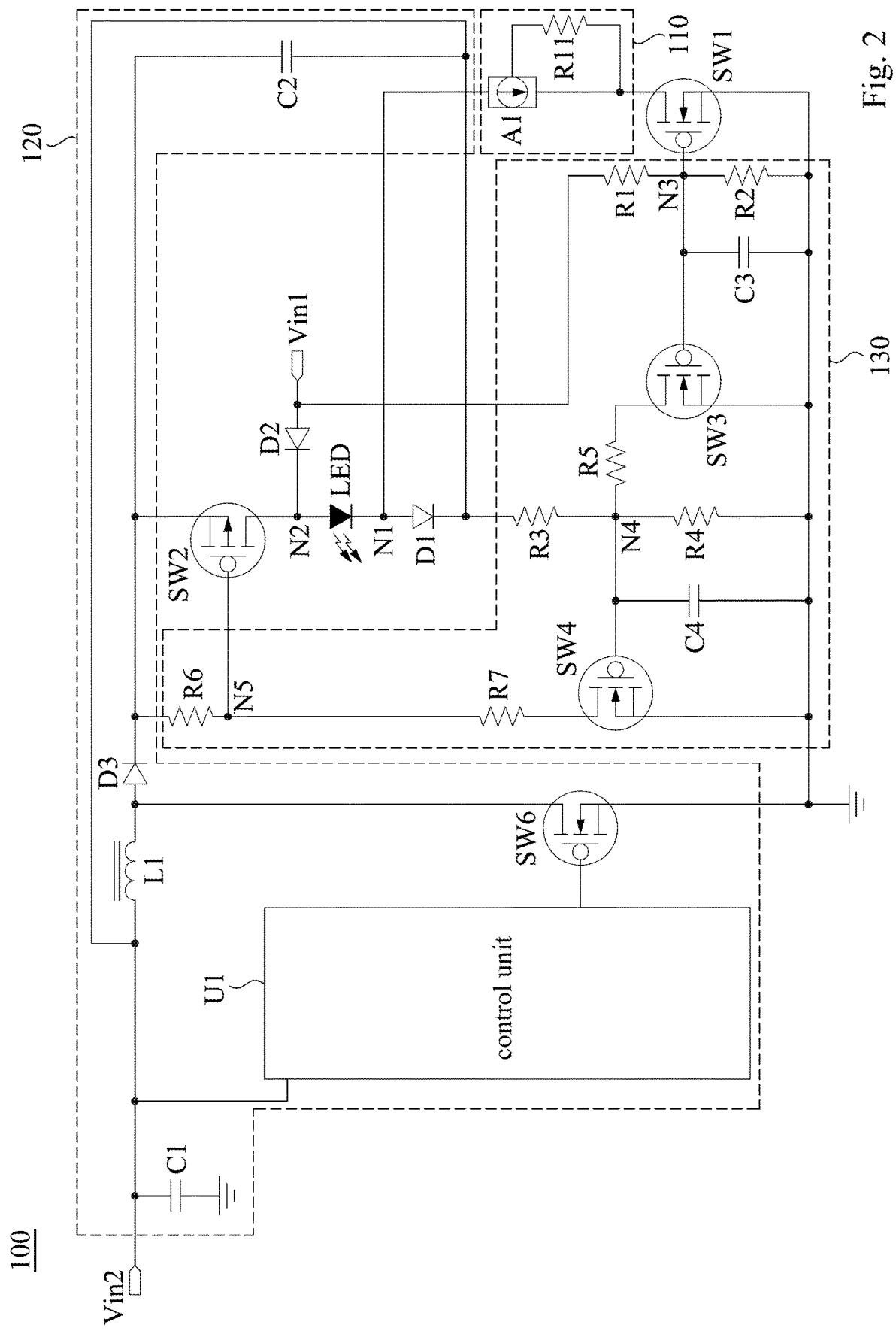
FIG. 2 is a schematic diagram illustrating a detail circuit of a lighting system in accordance with some embodiments of the disclosure.

Please refer to FIG. 2. FIG. 2 is a schematic diagram illustrating a detail circuit of a lighting system 100 in accordance with some embodiments of the disclosure. As shown in FIG. 2, lighting system 100 further includes an anti-backflow unit D1, an anti-backflow unit D2. The first power adjustment circuit 110 includes a current source unit A1 and a resistor R11. The second power adjustment circuit 120 includes a capacitor C1, a capacitor C2, an inductance L1, an anti-backflow unit D3, a switch SW6 and a control unit U1. The switch control circuit 130 includes a resistor R1, a resistor R2, a resistor R3, a resistor R4, a resistor R5, a resistor R6, a resistor R7, a capacitor C3, a capacitor C4, a switch SW3 and a switch SW4. In some embodiments, the first power adjustment circuit 110 may be implemented by a constant current regulator, such as a current integrated control circuit or resistor, but not intended to limit the present disclosure.

Specifically, a first terminal of the anti-backflow unit D1 is electrically connected to a node N1 between the light emitting unit LED and the current source unit A1 of the first power adjustment circuit 110. A second terminal of the anti-backflow unit D1 is electrically connected to the resistor R3 of the switch control circuit 130. A first terminal of the anti-backflow unit D2 is electrically connected to the resistor R1 and configured to receive the power signal Vin1. A second terminal of the anti-backflow unit D2 is electrically connected to a node N2 between the switch SW2 and the light emitting unit LED.

In some embodiments, a first terminal of the current source unit A1 of the first power adjustment circuit 110 is electrically connected to the node N1. A second terminal of the current source unit A1 is electrically connected to a second terminal of the resistor R11 and a first terminal of the switch SW1. A third terminal of the current source unit A1 is electrically connected to a first terminal of the resistor R11. In some embodiments, a first terminal of the first power adjustment circuit 110 is electrically connected to the node N1, a second terminal of the first power adjustment circuit 110 is electrically connected to the first terminal of the switch SW1 (not shown in figure).

A first terminal of the capacitor C1 of the second power adjustment circuit 120 is configured to receive the power signal Vin2. A second terminal of the capacitor C1 is electrically connected to a common voltage point. A first terminal of the inductance L1 is configured to receive the power signal Vin2. A second terminal of the inductance L1 is electrically connected to a first terminal of the anti-backflow unit D3 and a first terminal of the switch SW6. A control terminal of the switch SW6 is electrically connected to the control unit U1, and configured to receive a control signal output by the unit U1. A second terminal of the switch SW6 is electrically connected to the common voltage point. A second terminal of the anti-backflow unit D3 is electrically connected to a first terminal of the resistor R6, a first terminal of the switch SW2 and a first terminal of the capacitor C2. A second terminal of the capacitor C2 is electrically connected to the first terminal of the inductance L1, the second terminal of the anti-backflow unit D1 and a first terminal of the resistor R3.

A first terminal of the resistor R1 of the switch control circuit 130 is configured to receive the power signal Vin1. A second terminal of the resistor R1 is electrically connected to a node N3. A first terminal of the resistor R2 is electrically connected to the node N3. A second terminal of the resistor R2 is electrically connected to the common voltage point. A first terminal of the capacitor C3 is electrically connected to the node N3. A second terminal of the capacitor C3 is electrically connected to the common voltage point. The first terminal of the switch SW1 is electrically connected to the first power adjustment circuit 110. A second terminal of the switch SW1 is electrically connected to the common voltage point. A control terminal of the switch SW1 is electrically connected to the node N3.

A second terminal of the resistor R3 is electrically connected to a node N4. A first terminal of resistor R4 is electrically connected to the node N4. A second terminal of the resistor R4 is electrically connected to the common voltage point. A first terminal of the capacitor C4 is electrically connected to the node N4. A second terminal of the capacitor C4 is electrically connected to the common voltage point. A first terminal of the resistor R5 is electrically connected to the node N4. A second terminal of the resistor R5 is electrically connected to a first terminal of the switch SW3. A second terminal of the switch SW3 is electrically connected to the common voltage point. A control terminal of the switch SW3 is electrically connected to the node N3. The resistor value of the resistor R5 is smaller than the resistor value of the resistor R4.

The first terminal of the resistor R6 is electrically connected to the second terminal of the anti-backflow unit D3. A second terminal of the resistor R6 is electrically connected to a node N5. A first terminal of the resistor R7 is electrically connected to the node N5. A second terminal of the resistor R7 is electrically connected to a first terminal of the switch SW4. A second terminal of the switch SW4 is electrically connected to the common voltage point. A control terminal of the switch SW4 is electrically connected to the node N4. The first terminal of the switch SW2 is electrically connected to the second terminal of the anti-backflow unit D3 of the second power adjustment circuit 120. A second terminal of the switch SW2 is electrically connected to the light emitting unit LED through the node N2. A control terminal of the switch SW2 is electrically connected to the node N5.

Operationally, when the lighting system 100 receives the power signal Vin2 and does not receive the power signal Vin1, the switch SW2 and the switch SW4 turn on, the switch SW1 and the switch SW3 turn off, and the switch SW6 keeps switching between on and off.

Specifically, because the lighting system 100 does not receive the power signal Vin1, the voltage level of the node N3 is not high enough to make the switch SW1 and the switch SW3 turn on. Because the switch SW1 turns off, the first power adjustment circuit 110 does not operate. And when the switch SW3 turns off, the power signal Vin2 is divided by the resistor R3 and the resistor R4 and transmitted to the control terminal of the switch SW4, so that the switch SW4 turns on.

When the switch SW4 turns on, the voltage of the control terminal of the switch SW2 (i.e., the node N5) is divided by the resistor R6 and the resistor R7, so that the switch SW2 is forward bias and turns on. In the present embodiment, the control unit U1 of the second power adjustment circuit 120 receives the power signal Vin2 and outputs the control signal to the switch SW6, so that the switch SW6 operates switching. The current I2 output by the second power adjustment circuit 120 is determined based on different duty cycles for switching the switch SW6, and thus the light emitting unit LED may reach the target brightness.

In this way, when the lighting system 100 receives the power signal Vin2 and does not receive the power signal Vin1, the lighting system 100 will drive the light emitting unit LED to emit according to the power signal Vin2 and the current I2 transmitted by the second power adjustment circuit 120.

On the other hand, when the lighting system 100 receives the power signal Vin1, no matter whether the lighting system 100 receives the power signal Vin2, the switch SW1 and the switch SW3 turn on, and the switch SW2 and the switch SW4 turn off. Specifically, the power signal Vin1 is divided by the resistor R1 and the resistor R2 and transmitted to the control terminal of the switch SW1, so that the switch SW1 turns on. When the switch SW1 turns on, the power signal Vin1 flows from the anti-backflow unit D2 through the light emitting unit LED and the first power adjustment circuit 110 to the common voltage point to form a current loop.

In addition, the power signal Vin1 is transmitted to the control terminal of the switch SW3 through the voltage division of the resistor R1 and the resistor R2, so that the switch SW3 turns on. When the switch SW3 turns on, whether or not the power signal Vin2 is transmitted to the control terminal of the switch SW4 through the voltage division of the resistor R3 and the resistor R4, since the resistor value of the resistor R5 is much smaller than the resistor value of the resistor R4, the voltage level of the node N4 will be pulled down to the voltage level of the common voltage point through the switch SW3, resulting in the switch SW4 turns off. When the switch SW4 turns off, because the power signal Vin2 is not divided by the resistor R6 and the resistor R7 to form a loop, the voltage level of the control terminal of the switch SW2 (i.e., the node N5) makes the switch SW2 reverse bias and turn off.

In addition, since the control unit U1 of the second power adjustment circuit 120 does not receive the power signal Vin2, the control unit U1 will not output the control signal to the switch SW6, so that the switch SW6 will not operate.

As a result, no matter whether the lighting system 100 receives the power signal Vin2, as long as the lighting system 100 receives the power signal Vin1, the lighting system 100 will drive the light emitting unit LED to emit according to the power signal Vin1 and the current I1 transmitted by the first power adjustment circuit 110.

It should be noted that, the anti-backflow unit D1 is connected between the first power adjustment circuit 110 and the second power adjustment circuit 120; therefore, when the lighting system 100 receives both the power signal Vin1 and the power signal Vin2, the anti-backflow unit D1 is able to prevent the current of the power signal Vin2 flowing to the first power adjustment circuit 110. Similarly, the anti-backflow unit D2 is connected between the resistor R1 of the switch control circuit 130 and the node N2; therefore, when the second power adjustment circuit 120 provides the current I2 to the light emitting unit LED, the anti-backflow unit D2 is able to prevent the current I2 flowing to the resistor R1 and affecting the operation of the switch control circuit 130.

Figure 3:
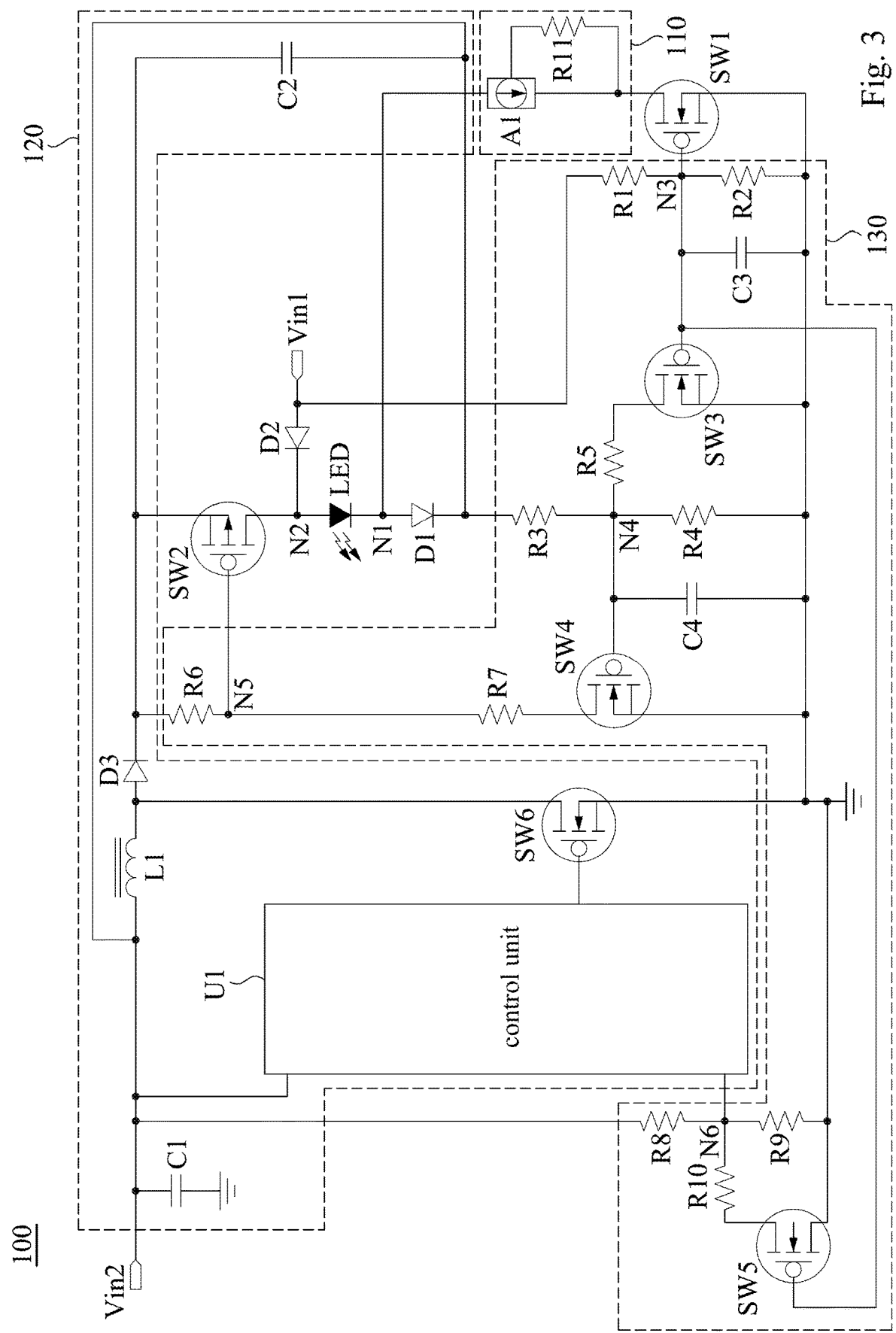
FIG. 3 is a schematic diagram illustrating a detail circuit of another lighting system in accordance with some embodiments of the disclosure.

In some other embodiments, as shown in FIG. 3, the switch control circuit 130 in the lighting system 100 further includes a resistor R8, a resistor R9, a resistor R10 and a switch SW5. Specifically, a first terminal of the resistor R8 is electrically connected to the second power adjustment circuit 120 and configured to receive the power signal Vin2. A second terminal of the resistor R8 is electrically connected to a node N6. A first terminal of the resistor R9 is electrically connected to the node N6. A second terminal of the resistor R9 is electrically connected to the common voltage point. A first terminal of the resistor R10 is electrically connected to the node N6. A second terminal of the resistor R10 is electrically connected to a first terminal of the switch SW5.

A second terminal of switch SW5 is electrically connected to the common voltage point. A control terminal of the switch SW5 is electrically connected to the node N3. The node N6 is electrically connected to an enable pin of the control unit U1.

Operationally, when the switch control circuit 130 receives the power signal Vin1, the switch SW5 turns on due to the voltage level of the node N3 received from the control terminal of the switch SW5. And the resistor value of the resistor R10 is much smaller than the resistor value of the resistor R9; therefore, the voltage level of the enable pin of the control unit U1 (i.e., the node N6) will be pulled down to the voltage level of the common voltage point through the switch SW5, so that the control unit U1 stops outputting the control signal to the switch SW6. When the switch SW6 does not receive the control signal and stops operating, the second power adjustment circuit 120 will stop operating.

In this way, by the resistor R8, the resistor R9, the resistor R10 and the switch SW5 controlling the enable pin of the control unit U1 of the second power adjustment circuit 120, when the lighting system 100 receives the power signal Vin1, the control unit U1 can be stopped operating to ensure the second power adjustment circuit 120 stops operating. Accordingly, as long as the lighting system 100 receives the power signal Vin1, whether or not the lighting system 100 receives the power signal Vin2, the lighting system 100 will transmit the smaller current I1 to the light emitting unit LED to emit through the first power adjustment circuit 110.

It should be noted that the sequence of execution of the processes in the foregoing flowcharts is merely an exemplary embodiment, not intended to limit to the present disclosure. Various alterations and modifications may be performed on the disclosure by those of ordinary skills in the art without departing from the principle and spirit of the disclosure. In the foregoing, exemplary operations are included. However, these operations do not need to be performed sequentially. The operations mentioned in the embodiment may be adjusted according to actual needs unless the order is specifically stated, and may even be performed simultaneously or partially simultaneously.

It is noted that, the drawings, the embodiments, and the features and circuits in the various embodiments may be combined with each other as long as no contradiction appears. The circuits illustrated in the drawings are merely examples and simplified for the simplicity and the ease of understanding, but not meant to limit the present disclosure. In addition, those skilled in the art can understand that in various embodiments, circuit units may be implemented by different types of analog or digital circuits or by different chips having integrated circuits. Components may also be integrated in a single chip having integrated circuits. The description above is merely by examples and not meant to limit the present disclosure.

In summary, in various embodiments of the present disclosure, the lighting system 100 selectively converts the electric energy into the current I1 or the current I2 by the corresponding one of the first power adjustment circuit 110 and the second power adjustment circuit 120 according to the power signal Vin1 and the power signal Vin2, so that the driving current received by the light emitting unit LED can be controlled within a smaller error, and so that the different brightness generated by the light emitting unit LED can meet the regulations.

Although specific embodiments of the disclosure have been disclosed with reference to the above embodiments, these embodiments are not intended to limit the disclosure. Various alterations and modifications may be performed on the disclosure by those of ordinary skills in the art without departing from the principle and spirit of the disclosure. Thus, the protective scope of the disclosure shall be defined by the appended claims.

What is claimed is:

1. A lighting system, suitable for receiving a first power signal and a second power signal, the lighting system comprising:
 a light emitting unit;
 a first power adjustment circuit, electrically connected to the light emitting unit;
 a first switch, electrically connected to the first power adjustment circuit;
 a second switch, electrically connected to the light emitting unit;
 a second power adjustment circuit, electrically connected to the second switch; and
 a switch control circuit, electrically connected to the light emitting unit, the first switch and the second switch,
 when the light emitting unit and the switch control circuit receive the first power signal, the switch control circuit turns on the first switch and turns off the second switch, so that a first current drives the light emitting unit to emit,
 when the light emitting unit and the switch control circuit do not receive the first power signal and the second power adjustment circuit receives the second power signal, the switch control circuit turns off the first switch and turns on the second switch, so that a second current drives the light emitting unit to emit.

2. The lighting system of claim 1, wherein the first current flows through the light emitting unit, the first power adjustment circuit and the first switch in order, the second current generated by the second power adjustment circuit flows through the second switch and the light emitting unit in order.

3. The lighting system of claim 1, wherein when the light emitting unit and the switch control circuit do not receive the first power signal and the second power adjustment circuit does not receive the second power signal, the first switch does not turn on and the second switch does not turn on, the light emitting unit does not emit.

4. The lighting system of claim 1, further comprising a first anti-backflow unit, a first terminal of the first anti-backflow unit electrically connected to a first node between the light emitting unit and the first power adjustment circuit, a second terminal of the first anti-backflow unit electrically connected to the switch control circuit.

5. The lighting system of claim 1, further comprising a second anti-backflow unit, a first terminal of the second anti-backflow unit configured to receive the first power signal, a second terminal of the second anti-backflow unit electrically connected to a second node between the second switch and the light emitting unit.

6. The lighting system of claim 1, wherein the switch control circuit comprises:
 a first resistor, configured to receive the first power signal; and
 a second resistor, connected in series between the first resistor and a common voltage point,
 wherein the first switch has a first terminal, a second terminal and a control terminal, the first terminal of the first switch electrically connected to the first power adjustment circuit, the second terminal of the first switch electrically connected to the common voltage point, the control terminal of the first switch electrically connected to a third node between the first resistor and the second resistor.

7. The lighting system of claim 6, wherein the switch control circuit further comprises:
   a third resistor, electrically connected to the light emitting unit;
   a fourth resistor, connected in series between the third resistor and the common voltage point;
   a fifth resistor, electrically connected to a fourth node between the third resistor and the fourth resistor, the resistor value of the fifth resistor is smaller than the resistor value of the fourth resistor; and
   a third switch, the third switch has a first terminal, a second terminal and a control terminal, the first terminal of the third switch electrically connected to the fifth resistor, the second terminal of the third switch electrically connected to the common voltage point, the control terminal of the third switch electrically connected to the third node.

8. The lighting system of claim 7, wherein the switch control circuit further comprises:
   a sixth resistor, electrically connected to the second power adjustment circuit;
   a seventh resistor, electrically connected to the sixth resistor; and
   a fourth switch, the fourth switch has a first terminal, a second terminal and a control terminal, the first terminal of the fourth switch electrically connected to the seventh resistor, the second terminal of the fourth switch electrically connected to the common voltage point, the control terminal of the fourth switch electrically connected to the fourth node,
   wherein the second switch has a first terminal, a second terminal and a control terminal, the first terminal of the second switch electrically connected to the second power adjustment circuit, the second terminal of the second switch electrically connected to the light emitting unit, the control terminal of the second switch electrically connected to a fifth node between the sixth resistor and the seventh resistor.

9. The lighting system of claim 6, wherein the switch control circuit further comprises:
   an eighth resistor, electrically connected to the second power adjustment circuit, configured to receive the second power signal;
   a ninth resistor, connected in series between the eighth resistor and the common voltage point;
   a tenth resistor, electrically connected to a sixth node between the eighth resistor and the ninth resistor, the resistor value of the tenth resistor is smaller than the resistor value of the ninth resistor; and
   a fifth switch, the fifth switch has a first terminal, a second terminal and a control terminal, the first terminal of the fifth switch electrically connected to the tenth resistor, the second terminal of the fifth switch electrically connected to the common voltage point, the control terminal of the fifth switch electrically connected to the third node.

10. The lighting system of claim 9, wherein when the switch control circuit receive the first power signal, the fifth switch turns on and so as to stop the second power adjustment circuit.

11. The lighting system of claim 1, wherein the first current causes the light emitting unit to consume a first power, the second current causes the light emitting unit to consume a second power, the second power is larger than the first power.

12. The lighting system of claim 1, wherein the first power adjustment circuit is a linear current source circuit, the second power adjustment circuit is a switch power conversion circuit.

* * * * *